Aug. 16, 1960   W. H. COLBERT ET AL   2,949,387
LIGHT TRANSMISSIVE ELECTRICALLY CONDUCTING ARTICLE
Filed Dec. 31, 1953

INVENTORS
William H. Colbert and
BY Willard L. Morgan
Nobbe & Swope
ATTORNEYS 2,949,387

LIGHT TRANSMISSIVE ELECTRICALLY CONDUCTING ARTICLE

William Harry Colbert and Willard Leroy Morgan, Pittsburgh, Pa., assignors to Libbey-Owens-Ford Glass Company, Toledo, Ohio, a corporation of Ohio Filed Dec. 31, 1953, Ser. No. 401,499

4 Claims. (Cl. 117—211)

This invention relates to a light transmissive electrically conductive optical article suitable for use as a lens, a window or a windshield or the like, which is unique in that it is coated with a highly transparent electrically conducting coating.

Reference is made to Patent No. 2,628,927 pertaining to a light transmissive electrically conductive article of which the present invention is a more durable modification and improvement.

Basically, the articles comprise a body of transparent glass or other transparent siliceous material having an intermediate transparent adhesive layer of metallic oxide directly adhered to the glass, and a thin continuous uniform film of transparent gold directly deposited upon and adhered to the adhesive layer. The invention is characterized in that the transparent gold layer is alloyed with a small percentage, namely 1% to 5% of a hard metal such as chromium, manganese, titanium, iron, vanadium or palladium by which construction it has been found that the products are not only strongly adherent and durable but have a maximum light transmission and are of a high degree of electrical conductivity when very thin films of the alloy are used.

With more particularity to its use, the invention relates to the production of a novel type of windshield or window for airplanes, automobiles, or other vehicles, or to other transparent optical articles such as a lens or goggle in which it is required that the thin film of gold alloy be extremely durable and have a high degree of light transmission and electrical conductivity as found in similar articles made with corresponding thicknesses of pure gold.

As is described in the above mentioned Patent 2,628,-927, it has been very difficult to secure high light transmission and high electrical conductivity along with durability in a thin metal coating deposited upon a glass support. In this regard, it was further mentioned that only certain metals, namely gold, silver, copper, iron, and nickel were found to give the effective coatings suitable for electrically heatable windshields, etc. Of these coatings, those of gold have been preferred by reason of their maximum electrical conductivity, maximum light transmission, and corrosion free properties. However, in using these films it has been desirable to form the thin films, which are of less than 200 Angstrom units thickness, in some manner so that they would be hard and abrasive resistant. To this end, we have found that by the addition of from 1% to 5% of the beforementioned preferred hard alloying metals that these metals give a desirable hardness to such gold films while not altering the desired high light transmission and electrical conductivity to any undesirable degree. It is pointed out, however, that the use of metals other than those mentioned have in some cases been found not to produce the desired result. For example, the alloying with small amounts of aluminum does not give an increase in hardness. Also, the use of larger amounts of metals than the upper prescribed limit of 5% has resulted in considerable losses in electrical conductivity and light transmission so that the resultant articles are not useful as electrically conductive windows or as optical parts for instrument use. On the other hand, the inventors have also found that at least 1% of the alloying metals are necessary in order to secure any appreciable increase in hardness and to produce the electrical and light transmission properties desired.

In forming the articles of the invention, there is first placed a coating of an adhesive layer of metallic oxide on a support body over which there is placed a coating of gold alloy and also possibly other protective layers over the gold, which coatings may be formed by thermal evaporation and by the method set forth in the reference patent. The alloy layer of gold which is composed of two or more separate metals of appropriate amounts may be evaporated from two or more filaments concurrently heated with care being taken to evaporate the two metals uniformly throughout the same firing time so as to thereby secure a preferred alloy layer construction.

As to the characteristics of the alloyed metal, experience has shown that for an electrically heated window the electrical resistivity in the electrically conducting film should be as small as possible and not more than 150 ohms per square. At the same time, experience has shown transparent closures such as windows, windshields or the like, should have a light transmission of not less than 50%. In fact, it is a present requirement of automobile windshields that they shall transmit at least 70% of normally incident light. Accordingly, in the present invention the light transparent electrically conducting film is designed to have an electrical resistivity of not more than 150 ohms per square while preserving a light transmission property of not less than 50%, and preferably of not more than 100 ohms and a light transmission of not less than 70%. Additionally, it has been experienced that when thin partially light transparent coatings of gold were applied by thermal evaporation directly upon glass it was found that the thin coatings were not adhered whatsoever to the glass and could be readily wiped off with the finger. Consequently, no permanent articles could be produced. It was then also found that directly applied thin metal coatings or films did not have the expected electrical conductivity or showed resistances which were high in view of known conductivity of massive gold.

In view of the foregoing general remarks, it is an object of the present invention to provide a partially transparent electrically conducting optical article which has a resistivity per square of not more than 150 ohms or a light transmission of not less than 50%.

It is a further object of the present invention to provide an article of the class described provided with a partially transparent electrically conducting film of metal.

It is a further object of the present invention to provide an electrically conducting film of metal which is substantially uniform in thickness, which is continuous, which is highly light transparent, which is of very high electrical conductivity, and which is of high durability.

Other objects and advantages of the invention will become more apparent during the course of the following description when taken in connection with the accompanying drawings.

In the accompanying drawings, wherein like numerals are employed to designate like parts throughout the same:

Figure 1:
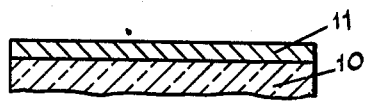
Figure 1 is a fragmentary section through a portion of an article showing the adhesive layer applied thereto.

The inventors have found that if the glass or other siliceous surfaces are first coated with an intermediate transparent adhesive layer of a metallic oxide, and the gold alloy is then thermally evaporated on the precoated support, an adherent deposit of the metal alloy is secured as compared with loose deposits which are secured when the gold alloy is deposited directly upon uncoated siliceous glass surfaces. The metal deposit thus produced is immediately characterized by being highly adherent to the precoated support. The metallic oxide directly and permanently adheres by molecular forces to the smooth glass or other siliceous surfaces and also acts by strong molecular adhesion to hold the metal film to itself. In such a manner a permanent article results; furthermore the metal deposit secured is different in several ways resulting from the fact that it is a continuous metal film. In the case of the gold alloy, the deposit appears by light transmission to be of the characteristic light-greenish yellow color with a slight tinge of gray appearing in some cases.

The adhesive attraction of the alloyed gold molecules by the metallic oxide surface exhibits itself by causing the deposited metal thereon to fasten more or less closely to the spot at which it is applied thereby causing the formation of a film which is continuous and of uniform thickness. The attraction between the metallic oxide atoms is not only an adhering type of action but is equivalent to a wetting action and the result is to secure a uniform film resulting from the wetting action of the metal upon the metallic oxide. It is obvious that for the gold films to be resistant they must be first adhered to the glass surface. In this regard, the use of the metallic oxides is important in securing a hard durable film and in permitting the formation of a continuous film on the oxide itself. However, it is to be pointed out that the hardness of the coatings of the present invention is also brought about by the use of small amounts of alloying metals in the gold which add durability to the films while using the same metallic oxide adhesive layers used in the previously mentioned patent.

Thus, by the use of a precoating of metallic oxide upon the article it has become possible to form a continuous highly transparent and highly adherent gold film which is very durable and which is of less than 150 Angstrom units thick. This same film is of high electrical conductivity and is adaptable to the production of highly transparent windows, windshields, and lenses which may be used under severe cold conditions and heated electrically to avoid the obscuring of the same by either fog or icing.

In producing the windshields, etc. a preferred procedure in applying the coating is to apply an alloy of gold containing the desired amount of the alloying element to a single thermal evaporation heating filament. This may be done with the various metals described as each of these evaporates at about the same evaporation temperature as gold which results in the deposit formed being a composite alloy of the metals evaporated.

Referring now particularly to the adhesive layer, we have found that the metallic oxides such as those of lead, silver, aluminum, magnesium, nickel, zinc, thorium and other rare earth metallic oxides and the oxides of cadmium, antimony, bismuth, mercury, copper, gold, platinum, palladium and other heavy metal oxides, when applied over glass or other siliceous surfaces, are highly adherent to such surfaces and they are adherent to the gold alloys which may be applied thereto by thermal evaporation for purposes of securing a coating on the articles. It has been found that with our new coated articles adhesive tape will not pull the metal films away from the glass because they are tightly adherent to the intermediate thin adhesive layers which in turn firmly adhere to the glass. This has been found to be true regardless of the thinness of the gold alloy films.

The metallic oxide adhesive films are preferably very thin being only a few molecules thick and not visible or otherwise detectable except for the fact that they do permit the forming of the highly adherent articles herein described. We have found that the thickness of layer necessary to develop adhesive forces and to present a surface for forming thereon a continuous metallic film deposit needs to be only a few molecules thick and as such, the presence of these oxides on the glass may not be detectable by any optical effects.

It will be noted that these metallic oxide adhesive layers may be deposited as a coating on the glass by direct thermal evaporation within a vacuum of small amounts of the desired metallic oxide. As examples of the oxides we may directly evaporate onto the glass surface by thermal evaporation within a vacuum, we may use lead oxide, cadmium, oxide, zinc oxide, aluminum oxide, chromium, oxide, and iron oxide.

As another means of forming the metal oxide, we may oxidize thin non-oxide metallic layers first deposited on the glass by thermal evaporation. Using this means, we may first evaporate a small amount of aluminum, tin, lead, or copper and then form these into the metallic oxides while on the glass surface by oxidizing in a vacuum chamber by an electrical glow discharge in the residual air.

A further way in which the layer of metallic oxides may be produced in position upon a glass or other support prior to the subseqeunt deposition of the gold alloy film thereupon is to proceed by first applying a thin coating by sputtering a metal in a residual vacuum suitable for sputtering in which the residual vacuum comprises in part oxygen such as from evacuating an air filled vessel. Thus, if copper or nickel is sputtered in the presence of residual air, copper oxide or nickel oxide deposits are formed on the glass, and the coatings thus produced are adherent to the glass. Also, when the metals silver, gold, and platinum are sputtered in the residual air evacuated system, it is found that the deposits are to a large degree composed of oxides of these metals and such coatings form metallic oxide adhesive layers for the forming of the articles of the invention.

In forming an electrically conducting article upon the oxide adhesive layer where the electrical conducting film is so extremely thin, it obviously becomes necessary that the coating be extremely uniform in thickness as otherwise, slight variations in thickness will result in variable electrical conductivity and the development of hot spots at thicker points along the film. These hot spots or localized heating areas lead to the burning out of the film. Therefore, in order to secure the necessary smooth, continuous, and uniformly thick metal conducting film, we prefer to deposit the coatings by means of thermal evaporation upon a support body of glass etc. which has been precoated with a metallic oxide. Such thermal evaporation provides a deposit formed by laying down one molecule upon the other as a process of molecular deposition. And, since the adhesive layer is deposited on a smooth surface of the support body and the metal film is deposited on the smooth surface of the adhesive layer without the possibility of intermingling in either case, the possibility of chemical reaction between the solid adhesive layer, the solid vitreous siliceous material, and the solid metal of the film is eliminated. Thus, it is apparent that the extremely effective adhesive layer is primarily the result of inherent molecular forces of attraction between the respective materials. Also, it is apparent that the films will duplicate the smoothness of the support body surface and follow its general contour.

Referring now to Figs. 1 to 9 there are illustrated certain aspects of the present invention. In Fig. 1 there is illustrated a body of glassy siliceous material at 10 to which a precoating of a layer of a metallic oxide 11 is applied. The layer 11 may be any of the precoating adhesive layers described in the foregoing description.

Figure 2:
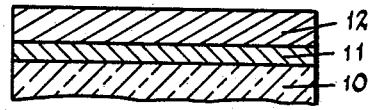
Figure 2 is a fragmentary sectional view through an article illustrating both the adhesive layer and the alloyed metal film applied thereto.

In Figure 2 the body 10 is illustrated after the application of a metal film 12 thereto, the alloyed metal film 12 being highly electrically conductive and highly transparent and strongly adhered to the glassy siliceous body 10 by the adhesive layer 11.

Figure 3:
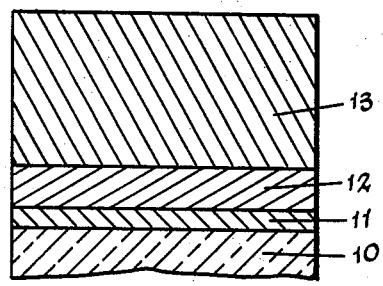
Figure 3 is a fragmentary sectional view through an article illustrating the adhesive layer, the alloyed metal film, and a protective coating applied thereto.

In Figure 3, the body 10 is illustrated with a protective coating 13 applied to the exposed surface of the alloyed metal film 12, the latter being adhered to the glassy siliceous body by the adhesive layer 11. The protective coating 13 may be any of those specifically described in the examples which follow, as for example, silica, or aluminum oxide, or magnesium fluoride.

Figure 4:
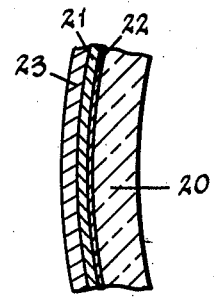
Figure 4 is a fragmentary sectional view through a curvilinear lens showing the adhesive layer, alloyed metal film, and the protective coating applied thereto.

In Figure 4 there is illustrated the application of the transparent electrically conducting alloyed film to a goggle 20, the film being indicated at 21 and adhered to the glassy siliceous material of the lens 20 by an adhesive layer 22. In this case, there is illustrated at 23, a protective coating applied over the exposed surface of the alloyed metal film 21, the protective coating being any suitable material such as those disclosed in connection with the protective coating 13 illustrated in Figure 3.

Figure 5:
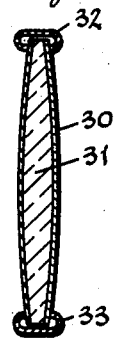
Figure 5 is a sectional view through a double convex lens having an alloyed metal conductive film applied to opposite sides thereof, and adhered to the lens surface by a metallic oxide adhesive layer.

In Figure 5 there is illustrated the application of the metallic conducting films 30 to both sides of a double convex lens 31. It will be understood that in this case the alloyed metal films are adhered as in the previous examples to the glassy siliceous material of the lens 31 by suitable adhesive layers (not shown). In this figure there are also illustrated electrical contacts 32 and 33 for supplying current to the electrically conducting coatings. It will be understood that the contacts 32 and 33 are provided in the form of arcs of circles having portions extending in area contact with peripheral portions of the metal film, and that the contacts 32 and 33 are separated from each other and that the current is completed between the contacts 32 and 33 through the metal films 30.

Figure 6:
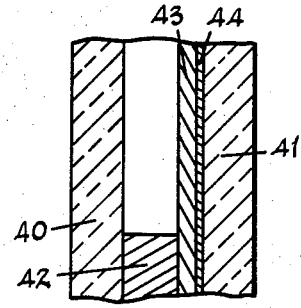
Figure 6 is a fragmentary sectional view through a double glazed window, one pane of which is provided with the electrically conducting alloyed film and adhesive layer.

In Figure 6 there is illustrated a portion of a double glazed window comprising panes of glass 40 and 41 connected along two opposite edges by metallic spacers 42, the spacers at the other two edges being of dielectric material. The glass 41 is illustrated as having applied thereto a transparent metal conducting film 43 which is adhered to the inner surface of the glass 41 by an adhesive layer 44. Electrical current is applied along opposite edges of the metal film 43 by suitable contacts which may be constituted by the metal spacers 42.

Figure 7:
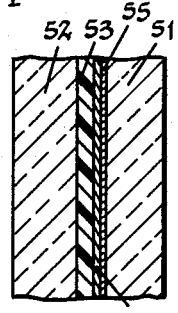
Figure 7 is a fragmentary sectional view through a laminated glass article such for example as a windshield, one ply of the glass having the alloyed metallic conducting film and adhesive layer applied thereto.

In Figure 7 there is illustrated a windshield of the well known safety glass construction which comprises outer and inner sheets of glass indicated at 51 and 52 respectively. These sheets of glass are assembled together into a sandwich with an interposed layer 53 of a suitable plastic material such for example as polyvinyl butyral or other plastic of approximately a preferred refractive index of about 1.5. By the choice of plastic of such approximate refractive index, it is found that the reflection from the coated surface is decreased upon lamination. The transparent metal conducting film 54 is adhered by a suitable metallic compound adhesive layer 55 to the inner surface of the glass sheet 51. With the parts in the relationship illustrated in this figure, the windshield is designed for use with the glass sheet 51 as the outer or forward sheet of a windshield.

Figure 8:
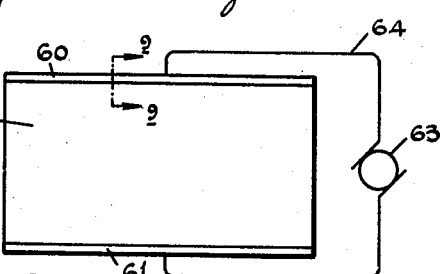
Figure 8 is a diagrammatic view illustrating a windshield and showing the manner in which the electrical circuit is completed through the metallic film.

Referring now to Figure 8 there is diagrammatically illustrated the manner of providing an electric circuit for a windshield. In this case elongated contacts 60 and 61 are provided along the long edges of the windshield 62, it being understood that the windshield 62 is provided with a transparent electrically conducting metal film such as that illustrated at 54, in Figure 7. An external source of current is indicated at 63 for connection by conductor 64 to the contacts 60 and 61, thus causing the current to traverse the alloyed metal film of the windshield.

Figure 9:
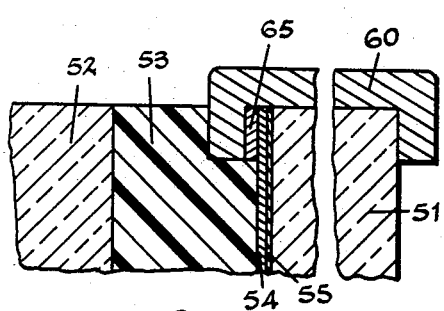
Figure 9 is an enlarged fragmentary sectional view on the line 9—9 of Figure 8.

In Figure 9 there is illustrated a section of Figure 8 showing the manner of attachment of a contact 60 to the electrically conducting film 54 which may be that illustrated in Figure 7. In this case, the metal film 54 is adhered to the glass sheet 51 by the adhesive layer 55. The glass sheet 51 is assembled with the glass sheet 52 by the intermediate ply of plastic 53 as above described. In order to provide a good contact between the contact element 60 and the alloyed metal film 54, additional metal is provided as indicated at 65. This may be done by additional thermal deposition of material along the edges of the article or it may be applied otherwise such for example as by spraying. The contact 60 which may be a strip of thin copper, has one edge embedded in the plastic material 53 and is retained in firm pressure contact with the metal 65 in the final assembly. The electric leads to the source of current may be applied to the contact 60 at the face of the glass.

It will be appreciated that the electrical resistances mentioned throughout this specification and used in the examples to follow are given as ohms per square area and that such electrical resistivities are as usual, the reciprocals of electrical conductivity, thus, the lower the electrical resistance the better the electrical conductivity, and if a film has an electrical resistance of 100 ohms per square it has such a resistivity regardless of whether the square is one inch on the side or one foot on the side. In applying the products of the invention to specific applications the desirability of securing very low electrical resistance or high electrical conductivity becomes emphasized in the choice of voltage at which the electrically heated window or lens, etc., must be operated in order to provide such energy. The voltage E required to supply a given amount of energy W to a square of treated glass one square foot in area, when the current is applied to a square of glass, can be determined by the following simple formula in which R is indicated as the electrical resistance.

$$E = \sqrt{WR}$$

Furthermore, within the limits permitted by a specific application, it is of course best to maintain a window to a minimum width in one direction since by elongating in the other and attaching the electrodes along the long edges, one secures the advantages of having a number of resistances thus connected in parallel.

Example 1

An electrically conductive window having an electrical conductively of 35 ohms per square, a light transmission of 66%, a reflectivity from the coated side of only 7.5%, and a reflectivity through the glass on the uncoated side of 8% was produced as follows: Nickel wire was sputtered in a vacuum in the presence of oxygen to produce an invisible nickel oxide coating on the window. The degree of vacuum was then increased with the vacuum pump to approximately $10^{-5}$ millimeters and then a gold alloy containing 1% nickel of sufficient quantity to produce a layer 48 Angstrom units thick was evaporated to the window from a tungsten filament. On top of this alloy layer there was then evaporated a protective layer of silica 225 Angstrom units thick. The resulting product secured was excellent as a window for the beforementioned purposes of de-icing, etc. and compared favorably with a generally similar product having a 48 Angstrom unit thickness pure gold layer applied on a glass support precoated with a nickel oxide sputtered film. The product coated with pure gold showed an electrical resistance of 33 ohms per square, a light transmission of 68%, a reflectivity from the coated side of 13.2%, and a reflectivity from the uncoated side of 8.6%. (This product differed also in not having the silica protective coating.) It was found that the product made employing the gold alloy was harder than the product made using the pure gold.

Example 2

In a modification of the window described in Example 1, a coating of iron oxide 4 Angstrom units thick was applied by direct evaporation and thereafter immediately in the same vacuum there was evaporated a layer of gold nickel alloy containing 5% of nickel, which layer was fired up to 48 Angstrom units thickness on top of which there was evaporated a layer 225 Angstrom units thick of silica. The resulting product showed a very high degree of durability which was much greater than that of Example 1 and which in turn was much harder than the comparable example cited made with pure gold. The product of this example showed a conductivity of 50 ohms per square, a light transmission of 59%, and reflectivities respectively of 8% and 6% from the coated and uncoated sides. This example may also be compared with a similarly made product using pure gold and comprising an adhesive layer 7 Angstrom units thick of aluminum oxide next to the glass, a pure gold layer of 48 Angstrom units thickness, and a quartz coating of 225 Angstrom units thickness; the resulting product having an electrical resistance of 30 ohms per square, a light transmission of 72%, and a reflectivity from the coated and uncoated sides of 12% and 6% respectively.

Examples 3 and 4

In further examples, two similar products were made using a gold and iron alloy which in one case had 1% iron and in the other case 5% iron, which alloys of this composition were applied to the evaporation filaments.

The products were made by evaporating a layer of 4 Angstrom units thickness of iron oxide on the glass, then evaporating a layer of gold alloy 48 Angstrom units thick over which was placed a protective layer of silica 225 Angstrom units thick. The electrically heatable window formed using the 1% iron alloy showed an electrical resistance of 50 ohms per square, a light transmission of 70%, and reflectivities from the coated and uncoated sides of 5% each. The 5% alloy produced showed an electrical resistance of 100 ohms per square, a light transmission of 52% and reflectivities of 10.5% and 9% from the coated and uncoated faces. Both of these products were very much harder than the generally similar pure gold coated product described under Example 1 with the 5% iron alloy product being extremely hard.

Example 5

In making a still further modification of the products described above, 4 Angstrom units of iron oxide were evaporated onto the glass surface after which there was evaporated to the glass a layer of 48 Angstrom units thickness composed of 2% chromium alloyed with gold and over this there was evaporated a layer of quartz of 225 Angstrom units thickness. The gold alloy was formed by the evaporation of two types of wires applied to the same filament, one wire being 5% chromium alloyed with gold and the other being of pure gold, the two being taken in a quantity sufficient to give a 2% chromium alloy of the entire amount of gold present. The resulting product showed an electrical conductivity of 70 ohms per square, a light transmission of 62%, and a reflectivity of only 7% and 6% from the coated and uncoated sides. These reflectivities compared very well and were less than from uncoated glass which showed 8.5% reflectivities when measured from either side.

Example 6

In this example there was evaporated 4 Angstrom units of iron oxide and then, by the evaporation of gold having a 5% chromium alloy therein, a layer of 48 Angstrom units thickness was built up. On top of the two layers there was then deposited a silica layer of 225 Angstrom units thickness which resulted in an end product having an electrical resistance of 100 ohms per square, a light transmission of 54%, and reflectivities from the coated and uncoated sides of 9% and 7% respectively.

Example 7

In this example, a layer of iron oxide of 4 Angstom units thickness was evaporated on the glass, and then an alloy of 5% palladium and gold was evaporated to produce a layer 48 Angstrom units thick over the iron oxide layer. On top of the gold alloy layer there was then evaporated a layer of 225 Angstrom units thickness of silica. The product so produced showed an electrical resistance of 39 ohms per square, a light transmission of 62%, and reflectivities from the coated and uncoated sides of 6% and 6.5%. This product was hard as was also the chromium example made in Examples 5 and 6 and each was harder than comparable products made with pure gold as the conducting layer.

It will be apparent that while in the examples there has been shown the use of one alloying metal, it will be apparent that one or more of the alloying metals may be present in the gold film at one time but the total quantity of the alloying metals other than gold must not exceed the upper limit of 5% or lower limit of 1%.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. An electrically conductive transparent article, comprising a body of transparent glassy siliceous material having a smooth continuous surface, a continuous intermediate transparent adhesive layer deposited by molecular deposition on said smooth continuous surface, said adhesive layer comprising a metallic oxide characterized by strong molecular adhesion both to glassy siliceous material and to metals and being at least one molecule in thickness, the adjacent surfaces of said body and adhesive layer being in continuous direct surface-to-surface contact and defining a smooth continuous interface, and a continuous film consisting substantially of gold alloyed with 1% to 5% by weight of a metal selected from the group consisting of the hard metals of chromium, nickel, iron, manganese, vanadium, titanium, and palladium deposited by molecular deposition on said adhesive layer and permanently and directly adhered throughout its area to said adhesive layer by molecular forces, said film being substantially uniform and less than 150 Angstrom units in thickness such that it has an electrical resistivity of not more than 150 ohms per square area, the light transmission of the article being at least 50% with the outer surface of said metal film being substantially smooth.

2. An article as defined in claim 1, in which the metal in the 1% to 5% quantity is iron.

3. An article as defined in claim 1, in which the metal in the 1% to 5% quantity is chromium.

4. An article as defined in claim 1, in which the metal in the 1% to 5% quantity is nickel.

References Cited in the file of this patent

UNITED STATES PATENTS

| | | |
|---|---|---|
| 2,042,972 | Thomas | June 2, 1936 |
| 2,440,691 | Jira | May 4, 1948 |
| 2,628,927 | Colbert et al. | Feb. 17, 1953 |

FOREIGN PATENTS

| | | |
|---|---|---|
| 234,233 | Switzerland | Dec. 16, 1944 |